United States Patent [19]

Srivastava et al.

[11] Patent Number: 6,061,676
[45] Date of Patent: May 9, 2000

[54] EFFECTING CONSTRAINT MAGIC REWRITING ON A QUERY WITH THE MULTISET VERSION OF THE RELATIONAL ALGEBRIC THETA-SEMIJOIN OPERATOR

[75] Inventors: Divesh Srivastava, New Providence, N.J.; Peter J. Stuckey, Elwood, Australia; Sundararajarao Sudarshan, Powai, India

[73] Assignee: Lucent Technologies Inc., Murray Hill, N.J.

[21] Appl. No.: 08/862,906

[22] Filed: May 23, 1997

Related U.S. Application Data

[XX .
[60] Provisional application No. 60/018,391, May 29, 1996.
[51] Int. Cl.[7] ................................................ G06F 17/30
[52] U.S. Cl. ............................ 707/3; 707/2; 707/4; 707/5
[58] Field of Search ................................ 707/1, 2, 3, 4, 707/5, 6

[56] References Cited

U.S. PATENT DOCUMENTS

| | | | |
|---|---|---|---|
| 5,548,755 | 8/1996 | Leung et al. ................................ | 707/2 |
| 5,687,362 | 11/1997 | Bhargava et al. .......................... | 707/2 |
| 5,694,591 | 12/1997 | Du et al. .................................... | 707/2 |
| 5,701,454 | 12/1997 | Bhargava et al. .......................... | 707/2 |
| 5,713,015 | 1/1998 | Goel et al. ................................. | 707/2 |

OTHER PUBLICATIONS

Implementation of Magic–sets in a Relational Database System, I.S. Mumick and H.Pirahesh, SIGMOD Record, vol. 23, Issue 2, Jun. 1994, pp. 103–114.

Query Optimization by Predicate Move–Around, A. Y. Levy, I.S. Mumick, Y. Sagiv, Proceedings of the 20th VLDB Conference, Santiago, Chile, 1994, pp. 96–107.

Magic is Relevant, I.S. Mumick, S.J. Finkelstein, H.Pirahesh, R.Ramakrishnan, SIGMOD Record, vol. 19, Issue 2, Jun. 1990, pp. 247–258.

Complex Query Decorrelation, P. Seshardri, H. Pirahesh, T.Y.C. Leung, Proceedings –12th Int'l Conference on Data Engineering sponsored by IEEE Computer Society Technical Committee on Data Engineering, vol. SE–11, No. 4, Apr. 1985, pp. 324–345.

Translating SQL Into Relational Algebra: Optimization, Semantics, and Equivalence of SQL Queries, S. Ceri and G. Gottlob, IEEE Transactions on Software Engineering, vol. SE–11, No. 4, Apr. 1985, pp. 324–345.

Compiling Query Constraints, P.J. Stuckey and S. Sudarshan, SIGMOD/PODS 94—May 1994, Minneapolis, MN, USA, 1994 ACM 0–89791–639–5/94/0005, pp. 56–67.

Query Porcessing in a System for Distributed Databases (SDD–1), P.A. Bernstein, N. Goodman, E. Wong, C.L. Reeve and J.B. Rothnie, Jr., ACM Transactions on Database Systems, vol. 6, No. 4, Dec. 1981, pp. 602–625.

Space/Time Trade–offs in Hash Coding with Allowable Errors, B.H. Bloom, Communications of the ACM, vol. 13, No. 7, Jul. 1970, pp. 422–426.

Optimization of Nonrecursive Queries, R. Krishnamurthy, H. Boral, C. Zaniolo, Proceedings of the 12th Int'l Conf. on Very Large Data Bases, Kyoto, Aug. 1986, pp. 128–137.

(List continued on next page.)

*Primary Examiner*—Wayne Amsbury
*Assistant Examiner*—Srirama Channavajjala
*Attorney, Agent, or Firm*—Geraldine Monteleone

[57] ABSTRACT

An equivalence rule having the multiset version of the relational algebraic theta-semijoin operator is used in effectuating Constraint Magic rewriting on a computer programming language query having non-equality, as well as equality, predicates. In particular, the rule effectuates Constraint Magic rewriting for a single join. When applied repeatedly on a sequence of joins, Constraint Magic rewriting is effectuated for a single block query. The rule may be used to generate relational algebraic expressions to optimize or determine the equivalency of queries. Cost estimates for alternative ways of evaluating a complex query can be efficiently computed. Based on these computed cost estimates, the least costly implementation of a complex query is determined.

10 Claims, 2 Drawing Sheets

OTHER PUBLICATIONS

Inderpal Singh Mumick et al., Magic is Relevant, SIGMOD Record, vol. 19, Issue 2, and 247–258, Jun. 1990.

Stefano Ceri et al. Translating SQL Into Relational Algebra: Optimization, Semantics, and Equivalence of SQL Queries, IEEE 1985, 324–345, Apr. 4, 1985.

Umeshwar Dayal, Of Nests and Trees: A Unified Approach to Processing Queries That Contain Nested Subqueries, Aggregates and Quantifiers, Proceedings of the 13th VLDB Conference, Brighton 1987, 197–208, Sep. 4, 1987.

C J Date, An Introduction to Database Systems, Text Book, Chap 6, p. 154 [sixth edition, 1995.

Inderpal Singh Mumick et al., Implementation of Magic–sets in a Relational Database System, SIGMOD RECORD, vol. 23, Issue 2, 103–114, Jun. 1994.

EFFECTING CONSTRAINT MAGIC REWRITING ON A QUERY WITH THE MULTISET VERSION OF THE RELATIONAL ALGEBRIC THETA-SEMIJOIN OPERATOR

The present application claims priority to co-pending U.S. Provisional Application Ser. No. 60/018391, filed on May 29, 1996.

FIELD OF THE INVENTION

The invention relates generally to database management systems and in particular to the optimization of SQL queries.

BACKGROUND OF THE INVENTION

Relational database management systems are well-known in the art. In a relational database, information is structured in a collection of tables in which data values are stored in rows under various column headings. The Structured Query Language ("SQL") allows users to access databases maintained under any number of relational database management systems and has become the standard for relational database access.

Data is retrieved from the relational database by means of a SQL query, such as, in particular, a so-called SQL "SELECT" statement. A simple SQL SELECT statement may be of the form SELECT specified field(s)

FROM specified table(s)

WERE specified condition(s) is true.

For example, the query

SELECT name

FROM employees

WHERE sal=100 results in a list of the names of those employees earning $100, where "employees" is a table defined to include information about all employees of a particular company.

Other operations may be specified in, or result from, a SQL query. Some examples are as follows. Data from two or more tables may be combined in a "join" operation. "Views" can be derived from one or more so-called "base tables." Aggregates, e.g., such operators as SUM and COUNT, specify operations to be performed on the collection of values in some column of a table. The GROUP BY operator allows for tables to be grouped by any combination of their fields. Finally, SELECT statements may also be nested, thereby forming different types of subqueries.

Since any combination of such SQL operations as those above may be found in one SQL query, a SQL query may become quite complex, and, in fact, this complexity has increased as SQL queries have evolved over time. In particular, simple queries are typically "one block" queries, that is, they can be expressed with one SELECT statement having single FROM, W]HERE, HAVING, and/or GROUPBY clauses. Simple queries have no subqueries or views. In contrast, a complex SQL query is composed of multiple blocks. An example of a complex SQL query is the so-called "decision-support" queries. Organizations have come to base decisions on results from these queries which are o-Ren defined using grouping/aggregation view relations and correlated subqueries (i.e., a subquery which is dependent upon some variable(s) whose value is determined in an "outer" query) .

SQL queries express what results are requested but do not state how the results should be obtained. In other words, the query itself does not tell how the query should be evaluated by the relational data base management system. Rather, a component called the optimizer determines the "plan" or the best method—for example, in terms of I/O and CPU processing costs—of accessing the data to implement the SQL query.

Because of the potential complexity of SQL queries, query optimization, especially with respect to decision-support queries, has become very important. Different approaches to decision-support query optimization include the use of relational algebra and "magic sets rewriting".

RELATIONAL ALGEBRA

Translating simple SQL queries into relational algebraic expressions is a well known optimization technique. Generally speaking, a query is received by a database management system either interactively from a user or from a program in which the query is embedded. The optimizer or optimizing portion of the database management system either translates the query into a relational algebraic expression or receives the already-translated relational algebraic expression from another component of the database management system. In either case, once the SQL query is in the form of a relational algebraic expression, so-called "equivalence rules" transform the expression into other equivalent algebraic expressions, thereby generating a "search space" or "space", i.e., the number of different alternative implementations that an optimizer will consider.

Once the search space is generated, cost estimates for each algebraic expression can be generated by utilizing the cost formulas for the relational algebraic operators and the different ways of evaluating these operators. The estimated least costly alternative is then chosen as the plan. For example, ajoin of two relations (or tables) may be implemented by choosing one relation to be the "outer" relation and, for each tuple (or row) of that outer relation, finding all matching tuples of the other relation (called the "inner" relation). These matching tuples are then concatenated to the tuple of the outer relation. Although the actual cost for the join depends on the particular database system, determining the outer and inner relations, or using other methods to implement the join, may affect the estimated cost of performing the join.

Variations of the above technique can be used for the optimization of complex queries. For example, in one variation, a complex SQL query is broken into smaller blocks. These blocks are then translated to relational algebraic expressions to which the equivalence rules and the above procedure are applied. The result is that, for each block, the "optimal" alternative is determined. This is referred to as "local" optimization. However, the optimization of the interaction between the blocks, the so-called "global" optimization, is performed on an ad-hoc basis outside of the relational algebra framework.

The relational operator called the semijoin operator has been used in the prior art to optimize simple distributed queries for set semantics (i.e., queries whose results include no duplicate values). I[n particular, it is used to optimize joins of database relations in distributed database systems. Joins in distributed database systems are potentially costly operations because in such systems the data to be joined is resident at different sites, thereby incurring communication costs as well as processing costs. By first performing a semijoin, the processing site sends join information to a receiving site and only the data which would in fact join is determined at the receiving site. Since less data is transmitted from the receiving site to the processing site, the costs of communicating the data aze thereby reduced.

MAGIC SETS REWRITING

To further improve the optimization process, the technique called "magic sets rewriting" is used to increase the search space. Magic sets rewriting optimizes complex SQL queries, such as view definitions and nested subqueries, by rewriting the queries more efficiently. Generally, the magic sets rewriting approach is to define a set of auxiliary "magic" (or "filter") relations that are used to filter out irrelevant or repetitive data that does not contribute to the results of the queries, for example, data which would not be used by subqueries. The most generalized form of magic set rewritings, called Constraint Magic rewriting, can handle non-equality conditions or predicates in queries, as well as equality predicates.

For any one query, there may be many different alternative rewritings. Generally, one or more of the rewritings are selected heuristically. The cost of processing the selected rewritings is compared with the cost of processing the query without the magic set rewrites, eventually choosing the least costly way. Although there have been recent efforts to provide cost-based techniques for selecting the most cost-effective rewriting (e.g., modeling magic sets rewriting as a special join method), magic sets rewriting generally remains a heuristic technique, with only a minimal cost-based component.

SUMMARY OF THE INVENTION

According to the principles of the present invention, an equivalence or transformation rule using te multiset version of the theta-semijoin operator is used to effectuate Constraint Magic rewriting. In particular, the rule effectuates Constraint Magic rewriting for a single join. When applied repeatedly on a sequence of joins, Constraint Magic rewriting is effectuated for a single block query.

Advantageously, the present invention can be utilized in conjunction with the inventions described in our co-pending U.S. patent application Ser. No. 08/862,459, in pending entitled "Query Optimization With Theta-Semijoins" and filed of even date herewith, to provide for the cost-based optimization of SQL queries on both a local and global basis. In particular, a collection of equivalence rules involving the theta-semijoin operator is used, in addition to equivalence rules known in the prior art, to generate relational algebraic expressions that are equivalent to a SQL query. These expressions may comprise a search space which is utilized by optimizing software or, alternatively, these expressions may be utilized by other types of software to, for example, determine the equivalency of queries. Cost estimates for alternative ways of evaluating a complex SQL query can be efficiently computed using the features of the present invention. Based on these computed cost estimates, the least costly implementation of a complex query is determined.

There are several other advantages provided by the present invention. Using the features of the invention, join optimizations and theta-semijoin transformations may be tightly integrated. The join of several relations may be implemented in various ways called "join orders" and may be illustrated in a so-called "join tree". For example, if a query calls for a join of four relations A1–A4, A1 and A3 may be joined first, followed by joining with A4 and then fmally with A2. Alternately, A1 and A2 may be joined first, then with A3 and finally with A4. Obviously there are other possible join orders. Using the theta-semijoin equivalence rule of the present invention for an initial part of the join tree and choosing a specific join order may direct the choices for later parts of the join tree. Further, whether or not to perform theta-semijoin transformations can be determined for each join independently, rather than at the level at the entire query.

Moreover, since the features of the present invention obtain the effects of Constraint Magic rewritings, such rewritings may now be integrated with cost-based optimization.

Finally, since the theta-semijoin transformations are specified in an algebraic fashion, they need not be carried out in a separate software module. Rather, they can be easily incorporated into existing cost-based optimizer generators that, given a collection of equivalence rules, generate an optimizer for a specific algebra (for example, the University of Colorado's so-called "Volcano"). The features of this invention need not be limited to SQL queries but may be applied to queries of any language translatable to relational algebra.

DETAILED DESCRIPTION

Overview

Figure 1:
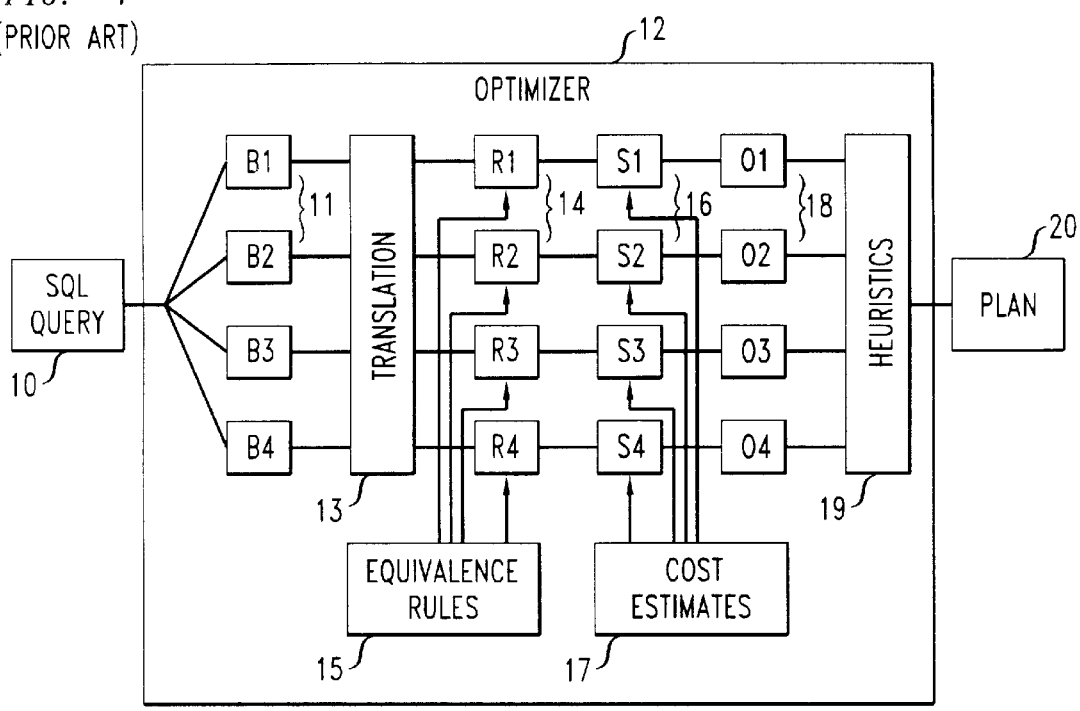
FIG. 1 illustrates an optimization technique used in the prior art.

FIG. 1 illustrates a simplified view of one prior art SQL query optimization technique. Upon receiving SQL query 10, optimizer 12 breaks down the query into any number of "blocks" 11 indicated as B1–B4. These blocks are then translated by a translation process 13 into relational algebraic expressions 14, indicated as R1–R4. A set of equivalence rules 15 are applied to each expression thereby generating, for each expression, a search space of equivalent relational algebraic expressions 16. These search spaces are indicated as S1–S4. Once each search space is generated, known cost estimates 17 for the various relational algebraic operators can be used to determine the optimal implementation 18 for that particular block, indicated as O1–O4. Finally, the optimizer determines the optimal interaction among blocks using certain heuristics 19, thereby producing plan 20. The latter is the method of accessing the data that will be used to implement the SQL query.

Figure 2:
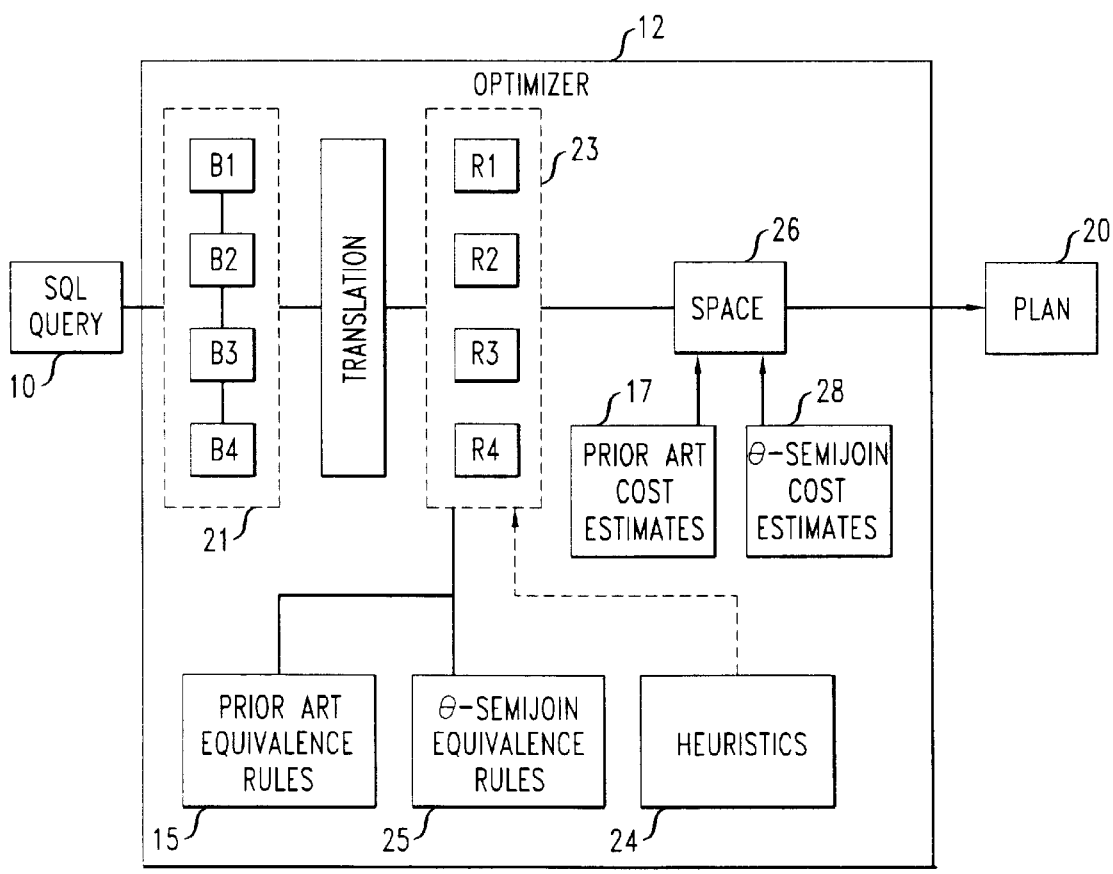
FIG. 2 illustrates an embodiment of an optimization technique according to the principles of the invention.

FIG. 2 illustrates an embodiment of an optimization technique according to the principles of the invention. A complex SQL query 10 is broken down into blocks 21, which are then translated by a translation process 22 into relational algebraic expressions 23. In contrast to the prior art technique described above, the "interrelationships" among the blocks 21 are also considered (as explained more fully hereinbelow) and expressed by using the theta semijoin operator. A set of equivalence rules consisting of the prior art equivalence rules 15 and the equivalence rules of the present invention 25 is used to generate search space 26. By considering not oniy blocks 21, but also the interrelationships among the blocks, in the relational algebraic expressions comprising search space 26, cost-based local and global optimizations are possible. Further, unlike the prior art technique of FIG. 1, search space 26 may be comprised of alternative implementations of the SQL query that address complexities such as correlated subqueries with inequality conditions in the W]RERE clause.

Using the additional equivalence rules of the invention expands the search space considered by the optimizer from that which would have been generated in the prior art. Depending on the particular query, the consideration of a much larger search space may not be the most cost-effective technique. Therefore, a set of heuristics 24 is provided such that the use of the theta-semijoin operator will be restricted in certain circumstances.

Once the search space 26 is generated, cost estimates of the prior ar relational algebraic operators 17 and the theta-serjoin cost estimates of the invention 28 are utilized to determine the optimal method of evaluating the SQL query 10, the plan 20.

COMPUTER ENVIRONMENT

Figure 3:
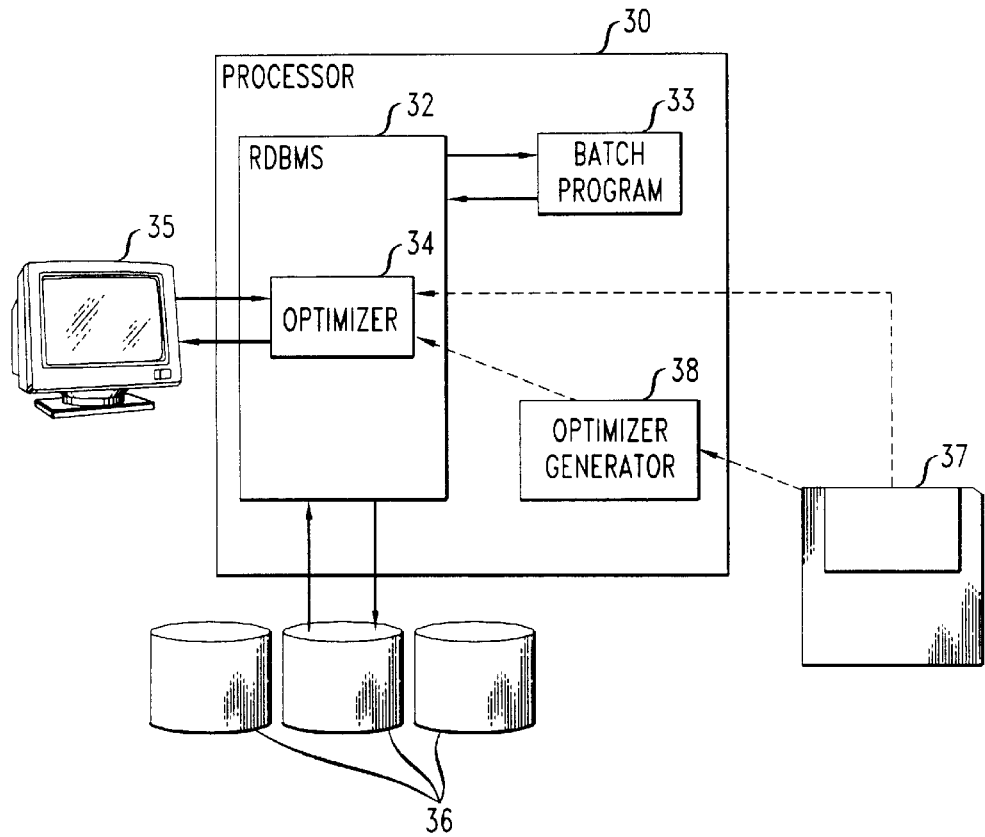
FIG. 3 illustrates a computer environment for use in accordance with the invention.

FIG. 3 illustrates an embodiment of a computer environment in which the invention may be used. In particular, the computer hardware environment includes processor 30 to which one or more electronic storage devices 36 and display terminal 35 may be connected. Processor 30 having a memory supports a relational data base management system (RDBMS) software 32 comprised of various software components including optimizer 34. The relational data bases and other related components (such as logging datasets) may reside on electronic storage devices 36 connected to processor 30. SQL queries may be input to the relational data base management system 32 interactively from user at display terminal 35 or by the batch execution of a computer software program 33 having embedded SQL statements. The queries, stored in memory, are thereafter operated upon by the relational data base management system, in particular, by the optimizer in accordance with the features of the invention.

The equivalence rules and cost estimates provided by the invention may be stored in any physical medium, such as a computer diskette 37, for eventual input to optimizer generator software 38. The optimizer generator software 38 in turn generates the appropriate optimizer given the collection of rules and estimates. Alternatively, the rules and estimates may be input directly to the data base management system optimizer if the optimizer is so-called "extensible" or designed to accept and utilize such input.

The following sections provide an in-depth consideration of the invention.

I. Illustrative Examle

As discussed earlier, in a relational database, information is structured in tables (or relations) in which data values are stored in rows (or tuples). A SQL SELECT statement is used to retrieve information from the database. The fields to be selected are specified in the SELECT clause by either the field name (e.g., fieldA) or by a name in which the table name and field name are concatenated (e.g., tableB.fieldA). The latter form may be used if there is more than one table containing fielda referenced in the FROM clause. A key may be defmed for a table and generally acts as an index to that table.

To see how the use of the theta-sei[]join transformations reduces the cost of answering a SQL query, consider the following example of an application where a supplier supplies many types of parts, each part having a given dollar value or cost (not to be confused with the above-discussed SQL query cost). The supplier has many warehouses. Each warehouse can store multiple types of parts, and each type of part can be stored in multiple warehouses. The relations are: Warehouse (LocId, Part, Quantity) and PartInfo (Part, Cost), where the underlined attributes form a key.

The supplier receives a set of requests for parts from a customer, as expressed by the relation Requests (Part, ReqQuantity, PriceLimit). Each row or tuple in the relation indicates the part, the required quantity and the maximum price per part the customer is willing to pay for the requested part. To determine which of the customer requests can be satisfied by the parts available in the warehouses, the supplier asks the following query Q1:

| | |
|---|---|
| SELECT | Available.Part |
| FROM | Requests, Available |
| WHERE | Requests.Part = Available.Part AND Cost <= PriceLimit |
| | AND TotalQuantity >= ReqQuantity |

FROM Requests, Available
WHERE Requests.Part=Available.Part AND Cost<= PriceLimit AND TotalQuantity >=ReqQuantity
where the view relation Available, defined below, contains information about the cost and total quantity of each part available in all the warehouses.

| | |
|---|---|
| CREATE VIEW | Available (Part, Cost, TotalQuantity) AS |
| SELECT | Warehouse.Part, Cost, SUM (Quantity) |
| FROM | Warehouse, PartInfo |
| WHERE | Warehouse.Part = PartInfo.Part |
| GROUPBY | Warehouse.Part, Cost |

Let us suppose that the supplier supplies 10,000 types of parts, has 20 warehouses, and stores each type of part in 10 warehouses on the average. Thus, the Warehouse relation has 100,000 tuples (i.e., 10 tuples for every type of part). The ParInfo relation has 10,000 tuples (i.e., one tuple for every type of part). Let us further suppose that the customer requests 100 types of parts, only 10 of which satisfy the condition PartInfo.Cost<=Requests.PriceLimit, and that the supplier can supply the required quantity of each type of part. The Requests relation therefore has 100 tuples.

The relative efficiency of evaluating the query in three cases can be compared: (a) the entire view Available is computed, and then joined with the Requests relation; (b) a view A1, obtained using magic sets is computed, and then joined with the Requests relation; and (c) a view A2, obtained using theta-semijoin transformations, is computed, and then joined with the Requests relation. The comparison is performed using two metics: (1) the number of tuples generated (as a result of joins, and grouping/aggregation), and (2) the number of tuples on which grouping/aggregation is performed. The greater the number of tuples in (1) and (2), the greater the processing cost associated with that particular method of evaluating the query.

In case (a), computing the entire view Available involves a join of the 10,000 tuples PartInfo relation with the 100,000 tuples Warehouse relation, resulting in a relation with 100,000 tuples. A grouping and aggregation is performed on this relation and the Available view has 10,000 tuples. The final join with the 100 tuple Requests relation results in computing 10 answers to the query Q1. A total of 110,010 (100,000+10,000+10) tuples are generated, and 100,000 tuples are grouped/aggregated.

In case (b), the magic sets rewriting optimization technique calls for the omputation of a view relation QueryAvailable(Part) called a "magic" or "query" relation. This view relation (which basically is the "parts" of the Requests relation) is used to restrict the computation of the view Available to generate only tuples that would be answers to the correlated queries on view Available, based on the equality Requests.Part=Available.Part. Since the Requests relation has 100 tuples, the QueryAvailable relation has 100 tuples as well. This is done by creating a specialized version A1 of the view Available (which references the view relation QueryAvailable) and by modifying query Q1 to use A1 instead of view Available.

It can be shown that computing view A1 involves a join of the 100 tuples QueryAvailable relation with the 10,000 tuples ParInfo relation, and the resulting 100 tuples intermediate result is joined with the 100,000 tuples Warehouse relation, resulting in a relation with 1000 tuples. A grouping and aggregation is performed on this relation and the A1 view relation has 100 tuples. The final join with the 100 tuple Requests relation results in computing 10 answers to the query Q1. A total of 1210 (100+1000+100+10) tuples are generated, and 1000 tuples are grouped/aggregated.

In case (c), the version A2 of the view Available is defined by using the theta-semijoin equivalence rules of the present invention. In contrast to the magic sets rewriting technique, the theta-semijoin equivaience rules consider the inequality condition "Cost<=PriceLimit" in addition to the equality condition "Requests.price=Warehouse.price". Applying both these conditions further reduces the set of tuples computed for the view relation Available—there are less tuples in version A2 than in magic set version A1—thereby significantly reducing the cost of query answering.

It can be shown that computing view A2 involves a join of the 100 tuples (projected) Requests relation with the 10,000 tuples PartInfo relation. The resulting 10 tuples intermediate result is joined with the 100,000 tuples Warehouse relation, resulting in a relation with 100 tuples. A grouping and aggregation is performed on his relation, and the A2 view relation has 10 tuples. The final join with the 100 tuples Requests relation results in computing 10 answers to the query Q1. A total of 130 (10+100+10 +10) tuples are generated, and 100 tuples are grouped/aggregated.

Thus, it can be seen that the use of the theta-semijoin equivalence rules considerably reduced the cost of answering the query. The size of the intermediate relations generated is reduced and the size of the inputs to the join and grouping/aggregation operations are reduced. In this case, the optimizer would select the relational algebraic expression of the query which utilizes the theta-semijoin operator as the least costly method of implementing the query.

II. Background and Definitions

The symbols R (with or without subscripts) are used to denote relations, $\theta$ (with or without subscripts) to denote quantifier-free predicates (i.e., conditions), E (with or without subscripts) to denote relational expressions, atts(E) to denote the attributes of the result of E, and $\bar{a}$ to denote a tuple of attributes. Relations are treated as multisets of tuples, and hence the multiset version of relational algebra is used.

A grouping/aggregations operator is denoted by $\bar{a}\bar{F}\bar{f}$, where $\bar{a}$ denotes the groupby attributes and $\bar{f}$ denotes the aggregate operations performed on the groups defined by the groupby attributes.

A. Defition of the Multiset $\theta$-Semijoin

The multiset version of the $\theta$-semijoin operator, $\ltimes$ is defined as follows.

Given relations $R_1$ and $R_2$, $$(R_1 \ltimes_\theta R_2) \stackrel{def}{=} \sigma_{\exists t_2 \in R_2, \theta(t_2)}(R_1).$$

where $\theta(t_2)$ denotes the condition $\theta$ with attributes of $R_2$ replaced by their values from tuple $t_2$.

The definition of $\theta$-semijoin preserves the multiset semantics, i.e., the multiplicity of each tuple in the result is exactly the same as in $R_1$; each copy of tuple $\bar{t} \in R_1$ is present in $R_1 \ltimes R_2$ if and only if there exists a tuple $\bar{t}_2 \in R_2$ such that the pair of tuples $t_1$ and $t_2$ satisfies the condition $\theta$. For example, if the relation $R_1$ (A, B) is the multiset oftuples $\{(1,2), (1,2), (1,4)\}$, and $R_2$ (C, D) is $\{(3, 5,), (3, 6), (3, 7)\}$, then $R_1 \ltimes_{C \geq B} R_2 = \{(1, 2), (1, 2)\}$.

In the multiset relational algebra, $\theta$-semijoin is a derived operator, and can be expressed using the $\theta$-join, projection ($\pi$) and duplicate elimination ($\delta$) operators as follows:

$$(R_1 \ltimes_\theta R_2) \equiv (R_1 \bowtie_{Nat} (\delta(\pi_{attrs(R1)} (R_1 \bowtie_\theta R_2))))$$

where $\bowtie_{Nat}$ denotes natural join.

Some of the $\theta$-semijoin transformation rules described make use of functional dependencies present in relations. The functional dependencies present in a relation R are denoted by F D(R). In addition, the transformations also make use of function dependencies implied by conditions (such as $\theta$-join or $\theta$-semijoin conditions). For example, the condition x=y*y implies the functional dependency $\{y\} \to x$, and the condition x=y+z implies the functional dependencies $\{y,z \to x, \{x, y\} \to z$ and $\{x, z\} \to y$. The notation F D ($\theta$) is used to denote the set of all finctional dependencies implied by condition $\theta$.

The first step in the optimization is a translation to extended relational algebra. The standard translation of SQL to extended relational algebra is used. An SQL block of the form

| SELECT [DISTINCT] | attribute-list |
| FROM | relation-list |
| WHERE | selection-preds |
| GROUPBY | groupby-attrs | is translated to $$\delta(\pi_{pa}(_{\bar{a}}F_{\bar{a}\bar{f}}(\ldots(R_1 \bowtie_{\theta_1} R_2)\ldots \bowtie_{\theta_{n-1}} R_n)))$$

If the query does not have a GROUPBY clause, the groupby/aggregation operator is omitted, and if the DISTINCT is missing the $\delta$ operator is omitted.

B. Extended Relational Algebra

Extended relational algebra expressions E are generated by the following grammar.

| E | ::= R | relation name |
|---|---|---|
| | $\sigma_\theta(E)$ | multiset selection |
| | $\pi_{\bar{a}}(E)$ | multiset projection |
| | E ⊎ E | multiset union |
| | E · E | multiset difference |
| | E ∩ E | multiset intersection |
| | E $\bowtie_\theta$ E | multiset $\theta$-join |
| | E $\ltimes_\theta$ E | multiset $\theta$-semijoin |
| | E $⟕_\theta$ E | multiset left-outerjoin |
| | E $⟖_\theta$ E | multiset right-outerjoin |
| | E $⟗_\theta$ E | multiset full-outerjoin |
| | $_{\bar{a}}F_{\bar{f}}(E)$ | grouping/aggregation |
| | $\delta(E)$ | duplicate elimination |

In keeping with the SQL semantics, multiset union ⊎. defined additively, i.e., the cardinality of a tuple in the result is the sum of its cardinalities in each operand of ⊎Multiset versions of intersection and difference also follow the SQL semantics. Note that cross-products and natural joins can be expressed using $\theta$-joins.

C. Algebraic Summary of Constraint Magic Rewriting

This section presents a novel formulation, in algebraic notation, of the supplementary version of the Constraint Magic rewriting, which was originally presented as a source to source rewriting of Datalog rules. This formulation enables us to establish the connection between Constraint Magic rewriting and θ-semijoin transformations.

Given a set of view definitions, it is assumed that each view is used at most once. Consider a view V defined by:

$$V(\bar{a}) \stackrel{Vdef}{=} \pi_\sigma(...(R_1 \bowtie_{\theta_1} R_2)... \bowtie_{\theta_{n-1}} R_n)$$

If there is a set of queries on V of the form $\sigma_{\psi_i}(V)$, where the conditions $\psi_i$ are of the same form and differ only in the values of constants occuring in the $\psi_i$; Constraint Magic rewriting starts from the top-level queries on V and is recursively applied on view relations that are used in the definition of V. Consider the rewriting of view V.

The first observation of Constraint Magic rewriting is that all the $\psi_i$'s can be represented by a parametrized condition $\psi(\$c_1, \ldots, \$c_m)$, such that the $\psi_i$'s differ only in the values for the parameters $\$c_j$, $1 \leq j \leq m$. This set of queries can be represented by the parametrized condition $\psi$ and the query relation $Q_v(\$c_1, \ldots, \$c_m)$ containing, for each $\psi_i$, a tuple with values for the parameters defining $\psi_i$.

Magic Sets rewriting deals with a restricted case where $\psi$ is a conjunction of equality conditions of the form $V.a_i=\$c_j$; the attributes used in this conjunction are the "bound" attributes in the queries.

The second observation of Constraint Magic rewriting is that to answer the set of queries on V represented by $(\psi, Q_v)$, it is not necessary to compute all of V. In fact, it suffices instead to use a version V' of V, defined as follows:

$$V'(\bar{a}) \stackrel{Vdef}{=} \pi_\sigma((...(R_1 \bowtie_{\theta_1} R_2)... \bowtie_{\theta_{n-1}} R_n) \bowtie_\psi Q_v)$$

The use of V is then replaced by V'.

A novel contribution of this invention is the observation that parts of the semijoin condition can now be pushed into the join expression to filter out tuples from the results of intermediate joins, as well as from the relations ($R_1$, $R_2$, ... $R_n$) that participate in the join.

The notation $\psi^i$ is used to denote the portion of v that involves only attributes from $R_1, \ldots, R_j$ and $Q_v$. We define supplementary relations $S_i$, $i \geq 1$ as follows:

$$S_1 \stackrel{Vdef}{=} (Q_v \bowtie_{\psi^1} (R_1))$$

$$S_{i+1} \stackrel{Vdef}{=} (S_i \bowtie_{\theta_i \wedge \psi^{i+1}} (R_{i+1})), i > 1$$

The third observation of Constraint Magic (borrowed from Magic Sets) is that for each of the view relations $R_i$, $i \geq 1$ used in defining V, the only tuples of $R_i$ that need to be computed are those that can be used in the expression $S_i$. For $R_1$, the required tuples are the answers to the set of queries represented by ($\psi^1$, query_$R_1$), where query_$R_1$ is defined as $$\text{query\_}R_1 \stackrel{Vdef}{=} \pi_{attrs(\psi') \cap attrs(Q_v)}(Q_v)$$

For $R_{i+1}$, $i \geq 1$, the required tuples are answers to the queries represented by ($\theta_i \wedge \psi^{i+1}$, query_$R_{i+1}$), where query_$R_{i+1}$ is defined as $$\text{query\_}R_{i+1} \stackrel{Vdef}{=} \pi_{attrs(\theta_i \wedge \psi^{i+1}) \cap attrs(S_i)}(S_i)$$

Note that the sets of queries on the $R_i$'s are in the same parametrized notation as the original queries on V. IHence, the same procedure may be applied recursively to restrict the evaluation of the view relations $R_i$'s to the relevant tuples. The rewriting terminates when there are no more view definitions to be processed. A final phase discards view definitions that are no longer reachable from the top-level query.

III. Transformation (or Equivalence Rules)

A. Basic θ-Semijoin Transformations:

Optimizing SQL queries by makirng use of θ-semijoins involves specifying equivalence rules involving θ-semijoins, and other operators of the extended multiset relational algebra. Given a collection of equivalence rules, a transformational optimizer can be used to enumerate and compactly represent the logical search space. In a subsequent phase, cost formulas for the operators in the algebra are used to efficiently compute cost estimates for different ways of evaluating the query, and choosing the optimal way (in the logical search space represented) of evaluating the query.

The transformations below require a renaming step when pushing conditions through algebraic operations, and when changing the structure of the expressions. For simplicity of exposition, this renaming step is ignored.

1. Introduction of θ-Semijoin: Relational algebra expressions generated directly from SQL queries typically do not contain the θ-serioin operator (with the exception of using θ-semijoins only to handle HAVING clauses). Transformations 1a, 1b, 1c and 1d show how the θ-semijoin operator can be introduced into expressions with join, outerjoin, intersection and difference respectively.

Transformation 1a:

$$E_1 \bowtie_\theta E_2 \equiv E_1 \bowtie_\theta (E_2 \bowtie_\theta E_1)$$

Transformation 1b:

$$E_1 \bowtie_\theta E_2 \equiv E_1 \bowtie_\theta (E_2 \bowtie_\theta E_1)$$

A symmetric result holds for right-outerjoins.

Transformation 1c:

$$E_1 \cap E_2 \equiv E_1 \cap (E_2 \bowtie_{Nat} E_1)$$

where $E_2 \bowtie_{Nat} E_1$ denotes the natural semijoin of $E_2$ with $E_1$.

Transformation 1d:

$$E_1 - E_2 \equiv E_1 - (E_2 \bowtie_{attrs(E_2)=attrs(E_1)} E_1)$$

2. Pushing Selections through Semijoins:

Transformation 2a:

$$\sigma_{\theta_1}(E_1 \bowtie_{\theta_2} E_2) \equiv (\sigma_{\theta_1}(E_1)) \bowtie_{\theta_2} E_2$$

Transformation 2b:

$$E_1 \bowtie_{\theta_1 \wedge \theta_2} E_2 \equiv (\sigma_{\theta_1}(E_1)) \bowtie_{\theta_2} E_2$$

where $\theta_1$ involves only the attributes in attrs($E_1$).
Transformation 2c:

$$E_1 \bowtie_{\theta_1 \wedge \theta_2} E_2 \equiv E_1 \bowtie_{\theta_1} (\sigma_{\theta_2}(E_2))$$

where $\theta_2$ involves only the attributes in attrs ($E_2$).
3. Pushing/Introducing Projections:
Transformation 3a:

$$\pi_{\bar{a}}(E_1 \bowtie_\theta E_2) \equiv (\pi_{\bar{a}}(E_1)) \bowtie_\theta E_2$$

where $\theta$ does not involve the attributes in attrs($E_1$)—$\bar{a}$
Transformation 3b:

$$E_1 \bowtie_\theta E_2 \equiv E_1 \bowtie_\theta (\pi_{\bar{a}}(E_2))$$

where $\theta$ does not involve the attributes in attrs ($E_2$)—$\bar{a}$.
4. Pushing/Introducing Duplicate Elimination:
Transformation 4a:

$$\delta(E_1 \bowtie_\theta E_2) \equiv (\delta(E_1)) \bowtie_\theta E_2$$

Transformation 4b:

$$E_1 \bowtie_\theta E_2 \equiv E_1 \bowtie_\theta (\delta(E_2))$$

5. Pushing through Union, Intersection and Difference:
Transformation 5:

$$(E_1 \cup E_2) \bowtie_\theta E_3 \equiv (E_1 \bowtie_\theta E_3) \cup (E_2 \bowtie_\theta E_3)$$

Transformation 6:

$$(E_1 \cap E_2) \bowtie_\theta E_3 \equiv (E_1 \bowtie_\theta E_3) \cap (E_2 \bowtie_\theta E_3)$$

Transformation 7:

$$(E_1 - E_2) \bowtie_\theta E_3 \equiv (E_1 \bowtie_\theta E_3) - (E_2 \bowtie_\theta E_3)$$

B. Comlex θ-Semijoin Transfotrmations:
1. Pushing θ-Semijoin through Joins:
Transformation 8a:

$$(E_1 \ltimes_{\theta_1} E_2) \bowtie_{\theta_2} E_3 \equiv E_1 \ltimes_{\theta_1} (E_2 \bowtie_{\theta_2} E_3)$$

where $\theta_2$ involves only the attributes in attrs ($E_2$) ∪ attrs ($E_3$).

The symmetric rule for the case when $\theta_2$ involves only the attributes in attrs($E_1$) ∪ attrs ($E_3$) can be derived using the commutativity of θ-joins.

Transformation 8b:

$$(E_1 \ltimes_{\theta_1} E_2) \bowtie_{\theta_2} E_3 \equiv (E_1 \ltimes_{\theta_1} E_2') \bowtie_{\theta_2} E_3$$

where:

$$E'_2 = E_2 \ltimes_{\theta_1 \wedge \theta_2} (E_1 \bowtie_{True} E_3).$$

A symmetric rule can be derived for pushing a semijoin into $E_1$ using commutativity of θ-joins.
Transformation 8c:

$$E_1 \ltimes_{\theta_1 \wedge \theta_2} (E_2 \bowtie_{True} E_3) \equiv (E_1 \ltimes_{\theta_1} E_2) \bowtie_{\theta_2} E_3$$

where $\theta_1$ involves only the attributes in attrs ($E_1$) ∪ attrs ($E_2$), and $\theta_2$ involves only the attributes in attrs($E_1$) ∪ attrs($E_3$). Note that $\bowtie_{True}$ is equivalent to a cross-product.

2. Pushing θ-Semijoin through Outerjoins:
Transformation 9:

$$(E_1 ⟕_{\theta_1} E_2) \ltimes_{\theta_2} E_3 \equiv (E_1 \ltimes_{\theta_2} E_3) ⟕_{\theta_1} E_2$$

where $\theta_2$ involves only the attributes in attrs($E_1$) u attrs($E_3$).
3. Pushing θ-Semijoin through Grouping/Aggregation:
Transformation 10(a):

$$_{\bar{a}}F_{\bar{f}}(E_1) \ltimes_\theta E_2 \equiv {}_{\bar{a}}F_{\bar{f}}(E_1 \ltimes_\theta E_2)$$

where θ involves only the attributes in $\bar{a}$ and attrs ($E_2$)
Transformation 10(b):

$$[E_1 \cdot {}_{\bar{a}}F_{\overline{m=\min(E_1 \cdot b)}}(E_1)] \ltimes_{\theta \wedge (m \leq g(E_1 \cdot \bar{a}, attrs(E_2)))} (E_2) \equiv$$
$$E_1 \cdot {}_{\bar{a}}F_{\overline{m=\min(E_1 \cdot b)}}=[(E_1) \ltimes_{\theta \wedge (E_1 \cdot b \leq g(E_1 \cdot \bar{a}, attrs(E_2)))} (E_2)]$$

where θ involves only the attributes in $E_1.\bar{a}$ and attrs ($E_2$), and $g(E_1.\bar{a}, attrs(E_2))$ is any function all of whose arguments are from $E_1.\bar{a}$ and attrs ($E_2$). A symmetric result holds for the case of max with ≧.

4. Introducing Aggregation for Subsumption: Transformation 11 shows conditions under which some of the tuples in the right operand of a θ-semijoin operator are redundant, and a grouping/aggregation operator can be introduced into the right operand to reduce its size.

Transformation 11:

$$E_1 \ltimes_{g(E_2 \cdot \bar{x}, attrs(E_1)) \leq E_1 \cdot y} (E_2) \equiv$$
$$E_1 \ltimes_{g(E_2 \cdot \bar{x}, attrs(E_1)) \leq m(E_2 = \cdot \bar{x}} F_{\overline{m=\max(E_2 \cdot y)}}(E_2))$$

where g is any function all of whose arguments are from the attributes $E_2.\bar{x}$ and atrs ($E_1$). A symmetric result holds for the case of min with ≧.

In the case where the function $g(E_2.\bar{x}, attrs(E_1))$ is a single attribute of $E_1$, then the above transformation can be applied immediately arter Transformation 10b.

C. Simplification/Elimination Transformations:
1. Splitting/Combining θ-Semijoins:
Transformation 12:

$$E_1 \ltimes_{\theta_1 \wedge \theta_2} E_2 \equiv (E_1 \ltimes_{\theta_1} E_2) \ltimes_{\theta_1 \wedge \theta_2} E_2$$

By transforming the LHS to the RHS, other transformations (e.g., Transformation 10a) may get enabled. By transforming the EHS to the LHS, a θ-semijoin can be eliminated.

2. Simplification: Some of the θ-semijoin transformations can generate expressions where some conditions are checked more than once. The repeated checks are necessary in general, but in some special cases the repeated checks are redundant, and the expressions can be simplified by removing them. Transformations 13a and 13b can be used to eliminate repeated checks, when they are applicable.

Transformation 13a:

$$E_1 \ltimes_{\theta_1 \wedge \theta_2 \wedge \theta_3} (E_2 \ltimes_{\theta_1 \wedge \theta_2 \wedge \theta_4} E_1) \equiv E_1 \ltimes_{\theta_1 \wedge \theta_3} (E_2 \ltimes_{\theta_1 \wedge \theta_2 \wedge \theta_4} E_1)$$

where attrs ($E_2$) functionally determine all the attributes in θ2, under the finctional dependencies F D($\theta_1$) ∪ F D($E_1$).

Transformation 13b:

$$(E_1 \ltimes_{\theta_1 \wedge \theta_2 \wedge \theta_3} E_2) \ltimes_{\theta_1 \wedge \theta_2 \wedge \theta_4} E_2 \equiv (E_1 \ltimes_{\theta_1 \wedge \theta_2 \wedge \theta_3} E_2) \ltimes_{\theta_1 \wedge \theta_4} E_2$$

where attrs($E_1$) functionally determine all the attributes in $\theta_2$, under the fimctional dependencies F D ($\theta_1$) ∪ F D ($E_2$).

3. Eliminating θ-Semijoin: Intuitively, a θ-semijoin can be rewritten as a join followed by a projection if the join condition along with the functional dependencies of the right operand of the θ-semijoin guarantee that each tuple of the left operand is selected by at most one tuple of the right operand.

This intuition is formally captured by Transformation 14:

$$E_1 \ltimes_{(E_2 \cdot \bar{y} = \bar{g}(attrs(E_1))) \wedge \theta_1} E_2 \equiv \pi_{attrs(E_1)}(E_1 \bowtie_{(E_2 \cdot \bar{y} = \bar{g}(attrs(E_1))) \wedge \theta_1} E_2)$$

where $E_2 \cdot \bar{y}$ is a superkey of $E_2$, and $\bar{g}(attrs(E_1))$ is a finction of attributes of $E_1$ that returns a tuple of values with the same arity as $E_2 \bar{y}$.

D. Complex Derived Transformations:

Some useful complex transformations can be derived using combinations of the transformations described so far.

Transformation 15:

$$(E_1 \ltimes_{\theta_1} E_2) \ltimes_{\theta_2} E_3 \equiv (E_1 \ltimes_{\theta_2} E_3) \ltimes_{\theta_1} E_2$$

Transformation 16:

$$(E_1 \cdot \bar{a} F_{\bar{f}}(E_1)) \ltimes_{\theta_1 \wedge \theta_2} E_2 \equiv (E_1 \cdot \bar{a} F_{\bar{f}}(E_1 \ltimes_{\theta_1} E_2)) \ltimes_{\theta_1 \wedge \theta_2} E_2$$

where $\theta_1$ involves only attributes in $E_1 \cdot \bar{a}$ and attrs($E_2$).

Transformation 17:

$$(E_1 \ltimes_\theta E_2) \ltimes_{\theta_1 \wedge \theta_2 \wedge \theta_3} E_3 \equiv $$
$$((E_1 \ltimes_{\theta_1} E_3) \ltimes_\theta (E_2 \ltimes_{\theta_2} E_3)) \ltimes_{\theta_1 \wedge \theta_2 \wedge \theta_3} E_3$$

where $\theta_1$ involves only the attributes in attrs($E_1$) ∪ attrs($E_3$), and $\theta_2$ involves only the attributes in attrs($E_2$) ∪ attrs($E_3$).

Transformationl 18a:

$$E_1 \ltimes_{\theta_1 \wedge \theta_2} E_2 \equiv E_1 \ltimes_{\theta_1 \wedge \theta_2} (E_2 \ltimes_{\theta_1} E_1)$$

Transformation 18b:

$$(E_1 \ltimes_{\theta_1 \wedge \theta_3} E_2) \ltimes_{\theta_2 \wedge \theta_4} E_3 \equiv (E_1 \ltimes_{\theta_1 \wedge \theta_3} E'_2) \ltimes_{\theta_2 \wedge \theta_4} E_3$$

where $$E'_2 = E_2 \ltimes_{\theta_1 \wedge \theta_2} (E_1 \ltimes_{True} E_3).$$

The set of transformations described herein are extensive, but not exhaustive; under some special conditions, other transformations may be applicable. For instance, in the special case that whenever $E_2$ is empty, so is $E_1$, the expression $E_1 \ltimes_{True} E_2$ is equivalent to $E_1$.

IV. θ-Semijoin Optimization of Complex SQL Queries

Decision support queries are quite complex, and are often defined using view relations (or table expressions), and correlated subqueries. When correlated subqueries are decorrelated, the resulting decorrelated query usually has view relations (equivalently, table expressions), and may contain outelioin operators. When the FIROM clause of an SQL query block includes view relations, traditionally query optimizers attempt to "merge" the definitions of the view relations into the blocks that use the view relations; join order optimization is then performed on each merged block separately; no inter-block query optimization is performed.

When the view relations have grouping and aggregation, or are defined using SELECT DISTINCT, the view definitions cannot be straightforwardly merged, in general, while preserving the SQL multiset semantics. Such views are expected to arise frequently in decision support applications.

The above-defined θ-semijoin transformations enable effective optimization of such complex SQL queries that are not optimized well using traditional cost-based optimization techniques. The rule-based framework allows optimization of such queries to be easily integrated with a cost-based optimizer.

A. Optimizing Queries with Aggregation Views

Consider an SQL query Q whose FROM clause includes multiple relations to be joined, one of which is a view relation defined using grouping and aggregation. Such a query can be represented in the extended relational algebra by the expression.

$$Q = E_1 \bowtie_\theta {}_{\bar{g}}F_{\bar{f}}(E_2)$$

For obvious reasons, the definition of $E_2$ cannot be merged into the definition of Q, to enable join order optimization. Previous techniques to optimize such expressions include Magic Sets, Predicate Movearound, and techniques that push groupby/aggregation operations through joins. The θ-semijoin transformations combine (and extend) the benefits of both Magic Sets and Predicate Movearound in an algebraic framework.

Suppose $\theta = \theta_1 \wedge \theta_2$, such that $\theta_1$ is a conjunction of equality conditions of the form $E_1.a =$ and $E_2 a_2$ and $a_2 \in g$. Let $\bar{a}_1$ denote the set of all such attributes of expression $E_1$ in $\theta_1$. Magic Sets transformation first defines an auxiliary view:

$$QE_2(\overline{a}_1) \stackrel{Vdef}{=} \delta(\pi\overline{a}_1(E_1))$$

Subsequently, the expression Q is transformed to $$QE_2(\overline{a}_1) \stackrel{Vdef}{=} \delta(\pi\overline{a}_1(E_1))$$

The main limitation of Magic Sets is that it cannot use non-equality conditions in θ for optimizing the evaluation of $E_2$. Variants of Magic Sets, such as Extended Magic Sets, can additionally use inequality conditions of the form $E_2 \cdot a_2 < c$, where c is a constant, in some limited cases.

The effect of Predicate Movearound can also be understood algebraically. Suppose the join condition θ in Q is equivalent to $\theta_3 \wedge \theta_4$, such that $\theta_3$ is an arbitrary condition involving attributes only of $E_2$ that are in $\overline{g}$ and some restricted kinds of attributes from $\overline{f}$. Then the expression Q is transformed to $$E_1 \bowtie_\theta \overline{g} F_{\overline{f}}(\sigma_{\theta_3}(E_2))$$

The main limitation of Predicate Movearound is that it cannot use conditions involving attributes from both $E_1$ and $E_2$.

The θ-semijoin trsformations approach combines the benefits of both Magic Sets and Predicate Movearound, and can push arbitrary conditions in θ (not just equality conditions) involving attributes of both $E_1$ and $E_2$, for optimizing the evaluation of $E_2$.

First, the θ-semijoin operator is introduced, based on the join condition θ, using Transformation 1a, and Q is transformed to $$E_1 \bowtie_\theta \left(\overline{g} F_{\overline{f}}(E_2) \ltimes_\theta E_1\right)$$

Then, the θ-semijoin is pushed through the groupby/aggregation operator, to restrict the number of tuples of $E_2$ that participate in the grouping/aggregation to those that could subsequently join with $E_1$. The nature of the semijoin condition θ determines the result. When θ involves only attributes in $\overline{g}$ and attrs($E_1$), Transformation 10a can be used to transform Q to $$E_1 \bowtie_\theta \overline{g} F_{\overline{f}}(E_2 \ltimes_\theta E_1)$$

The intuition here is that, for each group of $E_2$, either all the tuples will be selected by ($E_2 \ltimes_\theta E_1$), or none will. The tuple in the result of the F operator generated from each group will correspondingly be selected or not.

When θ involves results of the aggregation, the θ-semijoin operator cannot be pushed through aggregation in general. Transformation 10b identifies cases when it is possible to push the θ-semijoin operator through $\overline{a}F\overline{f}$. Further, when $E_2$ is a complex expression, e.g., a join expression, the semijoin can also be pushed into $E_2$ to optimize the evaluation of $E_2$.

Note that both equality and non-equality conditions, involving attributes of both $E_1$ and $E_2$, have been used for optimizing the evaluation of $E_2$. More importantly, the transformation rules used are algebraic equivalences, and a cost-based optimizer could choose from among the different (equivalent) algebraic expressions generated.

B. Optimizing Queries with SELECT DISTINCT Views

Consider an SQL query Q whose FROM clause includes multiple relations to be joined, one of which is a view relation defined using SELECT DISTINCT. Such a query can be represented in the extended relational algebra by the expression $$Q = E_1 \bowtie_\theta \delta(E_2)$$

If the multiplicities of tuples is important for Q (e.g., it is used in an aggregation), and $E_2$ can have duplicates, the definition of view $E_2$ cannot be merged into the definition of Q. Previous techniques to optimize such expressions include the technique of pushing the duplicate elimination (δ) operator through joins, by modeling the δ operator as a groupby on all the arguments, with no aggregation performed. This technique is not always applicable, whereas the β-semijoin transformations can always be used here as described below. Moreover, the transformations can be combined with the optimizations of this technique cleanly within a transformation-based optimizer, so that the cheaper one gets chosen when both are applicable.

The effect of the θ-semijoin transformations on Q can be understood in two steps. In the first step, a new θ-semijoin operator is introduced, based on the join condition θ, using Transformation 1a. In the second step, the θ-semijoin is pushed through the duplicate elimination operator, using Transformation 4a, resulting in the expression $$E_1 \bowtie_\theta \delta(E_2 \ltimes_\theta E_1)$$

The effect is to restrict the tuples of $E_2$ on which the expensive duplicate elimination needs to be performed to those that would subsequently join with $E_1$.

C. Optimizing Queries with Correlated Subqueries and Outerjoins

Consider an SQL query Q that includes a correlated subquery. For improving set-orientedness of evaluation, the query may be decorrelated. The resulting decorrelated query has view relations (or table expressions) in the FROM clause, and may contain outerjoin operators, e.g., the left-outerjoin operator $⟕_\theta$. This is required by the semantics of correlated subqueries, especially in the presence of aggregate functions in the correlated subquery. Performing join-order optimization in the presence of outerjoins can be quite difficult, and traditional query optimizers often perform poorly on such complex queries.

The θ-semijoin transformations can be used to effectively optimize queries with outejoin operators. In particular, the transformations can be used in conjunction with any technique for decorrelating a correlated subquery, to reduce the amount of irrelevant computation performed in evaluating the decorrelated view relation.

Consider an SQL query Q whose FROM clause includes multiple relations, at least one of which is a view relation, and some of the relations have to be left-outerjoined. Such a query can be represented in the extended relational algebra by the expression $$Q = E_1 ⟕_\theta E_2$$

This query can be optimized, using Transformation 1b, to obtain the expression:

$$E_1 \bowtie_\theta (E_2 \bowtie_\theta E_1)$$

When $E_2$ is a complex expression, Q can be further optimized using the techniques described herein.

An alternative decorrelation technique in the prior art, Magic Decorrelation, combines the advantages of Magic Sets with decorrelation. In effect, this technique computes an auxiliary view relation that contains the bindings that are used to invoke the correlated subquery, and the left-outetoin is performed with the auxiliary relation as part of the defrnition of the decorrelated view relation. Magic Decorrelation can only use equality conditions; with non-equality conditions, using outeroins would result in incorrect multiplicities.

Outerjoins can also be directly specified by the user in the FROM clause of the SQL query. When such outeroins are specified in a view relation, $\theta$-semijoin transformations can be used to optimize the evaluation of the view relation.

The $\theta$-semijoin transformations do not have to be made heuristically; the transformation rules used are algebraic equivalences, and an optimizer could use cost estimates to choose from among the different (equivalent) algebraic expressions generated.

V. Cost Model for $\theta$-Semijoin

The costing phase of a transformational optimizer uses cost formulas for the operators in the algebra to efficiently compute cost estimates for the different ways of evaluating the query. This section describes how cost formulas for the $\theta$-semijoin operator can be determined, assuming the availability of cost formulas for the other operators in the multiset relational algebra, in particular the $\theta$-join.

The $\theta$-semijoin operator is a derived operator in the extended multiset algebra, and can be expressed using the $\theta$-join, projection ($\pi$) and duplicate elimination ($\delta$) operators; implementing the $\theta$-semijoin operator in this fashion is, however, quite inefficient.

The $\theta$-semijoin-operation $R_1 \ltimes_{74} R_2$ can be efficiently implemented using minor changes to join techniques such as hash joins and index joins. One implementation treats the left operand $R_1$ of the $\theta$-semijoin as the "outer" relation in the join technique. For each tuple in the outer relation $R_1$, instead ofjoining it with each matching tuple in the inner relation $R_2$, the tuple in $R_1$ can be returned as soon as a match is found. Sort-merge joins can similarly be adapted to implement $\theta$-semijoins if the join condition is an equijoin.

An alternative implementation treats the right operand $R_2$ of the $\theta$-semijoin as the "outer" relation in the join technique. For each tuple in the outer relation $R_2$, all matching tuples in the inner relation $R_1$ are returned. If a tuple in $R_1$ is already in the result as a consequence of matching a different $R_2$ tuple, it is not added to the result; an efficient implementation requires an index on the result of the $\theta$-semijoin, in general. When the $\theta$-semijoin condition involves an equijoin with a superkey of $R_2$, it is guaranteed that a tuple in $R_1$ matches at most one tuple in $R_2$; no index on the result of the $\theta$-semijoin is required in this case. Using $R_2$ as the outer relation in the join algorithm as above is beneficial when, e.g., the right operand $R_2$ of the $\theta$-semijoin is smaller than the left operand $R_1$.

The cost formulas for the different join techniques are easily modified to derive cost formulas for the different ways of implementing the $\theta$-semijoin operator.

Approximate versions of the $\theta$-semijoin operation can be efficiently implemented using Bloom filters, which are fixed size bit vectors. When the $\theta$-semijoin condition is an equality condition, standard hashing techniques can be used to mark bits. For inequality conditions, possible options for marking bits include partitioning the domain of an attribute value and using a bit to represent each partition. This option is particularly useful when the $\theta$-semijoin condition has been derived from a band join. Cost formulas for using Bloom filters can hence be used to derive the cost formulas for approximate versions of the $\theta$-semijoin operator.

Several of the equivalence rules involving the $\theta$-semijoin operator (e.g., Transformation 1a) introduce cormon subexpressions. The decision on whether to replicate the computation of the subexpressions, or to materialize the result of the subexpression and reuse the results, should be based on the relative cost estimates of the two approaches and is left to the cost-based optimizer. A useful heuristic is to materialize the results of common subexpressions and reuse the results wherever required. If the optimizer cannot explicitly deal with common subexpressions, it is straightforward to change the formulation of the equivalence rules to replace the subexpressions by a (temporarily) materialized relation, thereby performing common subexpression elimination at the level of the equivalence rules.

A. Heuristics for Cost-Based Optimization

A cost-based transformational optimizer extended with the $\theta$-semijoin operator and our transformation rules would generate a superset of the query plans that the unextended optimizer would generate. While this could result in a plan with a cheaper (estimated) cost being chosen by the extended optimizer, it could considerably increase the cost of query optimization by increasing the search space. This section discusses some heuristics that reduce the generated search space. It is desirable that these heuristics satisfy the following criteria:

1. The heuristics should not prune away algebraic expressions that optimize certain classes of SQL queries (for example, queries with aggregation views, queries with SELECT DISTINCT views, queries with correlated subqueries and outer joins) that are not optimized well using traditional join-ordering optimizers.

2. For SQL queries that are optimized well using traditional join-ordering optimizers, the search space should not increase.

The following heuristics restrict the applicability of the transformation rules that introduce the $\theta$-semijoin operator.

First, transformation 1a should be applied only when $E_2$ is of the form $\delta(E_3)$, or of one of the forms $_a F_f(E_3)$ or $\pi_{pa}(_a F \bar{f}(E_3))$.

The first case arises when the view in the FR(OM clause has a SELECT DISTINCT, and the latter cases arise when the view in the FROhM clause has grouping and aggregation.

Second, transformations 1c and 1d should be used only when the size of the result of $E_1$ is smaller than that of $E_2$ on an order of magnitude (e.g., ten times or more smaller).

The transformation rules that introduce the $\theta$-semijoin operator in the presence of outerjoins should be retained. This enables the optimization of the decorrelated view relations obtained from correlated subqueries.

These heuristics satisfy the above desired criteria. In particular, if the algebraic expression obtained from the query only has occurrences of the selection operator $\sigma_\theta$, the projection operator $\pi_{\bar{a}}$, and the join operator $\bowtie$ the transformations do not add to the search space at all; traditional optimization techniques are adequate for such queries. Also, using these heuristics can considerably restrict the search space over unrestricted use of the transformation rules, for general SQL queries, since a typical query has far fewer occurrences of the grouping/aggregation operator, the duplicate elimination operator, and the outed in operators than it has of the join operator.

VI. $\alpha$-Semijoin and Constraint Magic Rewriting

Magic rewritings optimize database queries by defining a set of auxiliary magic (or query) relations, that are used as filters to restrict computation of the query. Below is a derived transformation rule that captures the key intuition of Constraint Magic rewriting for a single join. Applying this transformation rule repeatedly on a sequence of joins has an effect similar to Constraint Magic rewriting, for a single block SQL query. A heuristic for applying the method of SQL queries that use view relations in addition to database relations is also included. The heuristic simulates the behavior of Constraint Magic rewriting on such queries.

A. CM Transformation Step Using $\theta$-Semijoin

The following transformation rule captures the basic step of Constraint Magic rewriting:

$$(E_1 \bowtie_{\theta_1} E_2) \bowtie_{\theta_2 \wedge \theta_3} Q \equiv (E'_1 \bowtie_{\theta_1} E'_2) \bowtie_{\theta_2 \wedge \theta_3} Q$$

where $\theta_2$ involves only the attributes in attrs (Q) U attrs($E_1$), and $E'_1$ and $E'_2$ are defined below:

$$E'_1 = E_1 \bowtie_{\theta_2} Q$$

$$E'_2 = E_2 \bowtie_{\theta_1 \wedge \theta_3} (E'_1 \bowtie_{\theta_2} Q)$$

Figure 4:
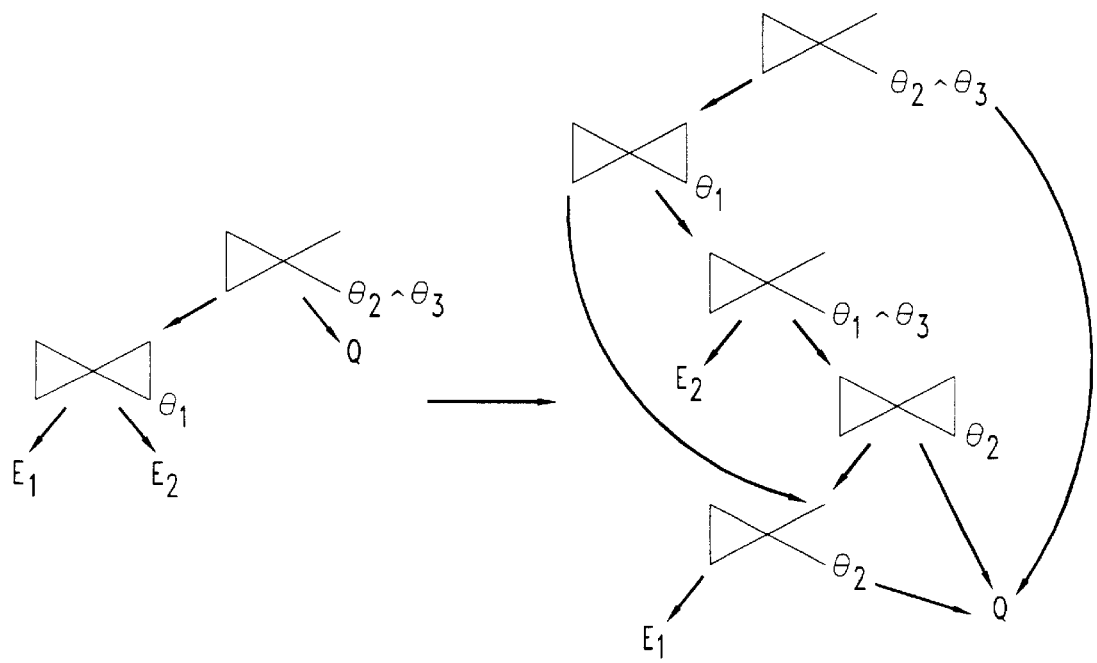
FIG. 4 pictorially demonstrates the effective simulation of Constraint Magic rewriting.

The above transformation is referred to as the Constraint Magic Transformation (CMT) Step and is shown pictorially as an algebraic equation graph in FIG. 4.

The CMT step is a derived transformation rule, and follows from an application of Transformation 12, commutativity of $\theta$-joins, an application of Transformation 8a (to generate $E'_1$), Transformation 8b (to generate the basic structure of $E'_2$), Transformation 2c, and finally the transformation $$\sigma_{\theta_2}(Q \bowtie_{True} E'1) \equiv Q \bowtie_{\theta_2} E'_1,$$

which defines the $\theta$-join. As with Transformations 18a and 18b, weaker versions of the join and semijoin conditions can be used to define $E'_1$ and $E'_2$ in the CMT step.

B. Connection of CMT Step and Constraint Magic Rewriting

The expressions defining $E'_1$ and $E'_2$ in the CMT step capture the essence of Constraint Magic rewriting. For example, suppose there is a set of queries Q on the result of a join of relations $E_1$ and $E_2$ In Constraint Magic rewriting of this join, the "query relation" (also called the "magic relation") Q is first used to restrict computation to $E_1$ to tuples relevant to Q. Then the set of $E_1$ tuples thus restricted are used along with the query Q to restrict computation of $E_2$. This strategy is exactly captured in the CMT step.

More formally, the connection can be established as follows. Consider a view defined as:

$$V \stackrel{Vdef}{=} (E_1 \bowtie_{\theta_1} E_2)$$

with a query relation Q, and a parametrized condition $\theta_2 \wedge \theta_3$ where $\theta_2$ involves only the attributes in attrs (Q) U attrs($E_1$). (This is the same as the LHS of the CMT step.) The Supplementary Constraint Magic rewriting first defines supplementary relation $S_1$ below:

$$S_1 \stackrel{Vdef}{=} Q \bowtie_{\theta_2} E''_1$$

where $E''_1$ is the result of supplementary Constraint Magic rewriting of $E_1$ with the query relation Q and the parametrized condition $\theta_2$. View V is then replaced by view V' defined below:

$$V' \stackrel{Vdef}{=} S_1 \bowtie_{\theta_1 \wedge \theta_3} E''_2$$

where $E''_2$ is the result of the supplementary Constraint Magic rewriting on $E_2$, with the query relation $S_1$, and the parametrized condition $\theta_1 \wedge \theta_3$.

The main difference between the Constraint Magic rewriting and the CMT step on a single join is that Constraint Magic rewriting uses $\theta$-joins rather than $\theta$-semijoins. Although the final expression using $\theta$-semijoin is more complex than the definition of V generated by Constraint Magic rewriting, the added complexity is required to preserve the multiset semantics.

C. CM Transformation of an SQL Block Using $\theta$-Semijoin

The algebraic expression V generated by transforming a single block SQL query is ofthe form:

$$V : \pi_{\overline{pa(ga}} F_{\overline{af}}((\ldots R_1 \bowtie_{\theta_1} R_2) \ldots \bowtie_{\theta_{n-1}} R_n))$$

Given a set of queries on V, denoted by $V \bowtie_\psi Q$, the following sequence of transformations can be applied to $V \bowtie_\psi Q$. First, identify the strongest subset of $\psi$, denoted by $\psi_n$, that can be pushed through the groupby/aggregation operator. If the original query did not use GROUPBY, $\psi_n$ is the same as $\psi$. Then, $\bowtie_\psi Q$ can be pushed inside the projection operator, using Transformation 3a (from RHS to LHS), and the groupby/aggregation operator, using either of Transformations 10a or 10b, whichever is applicable, to obtain:

$$V1 : \pi_{\overline{pa(ga}} F_{\overline{af}}((\ldots R_1 \bowtie_{\theta_1} R_2) \ldots \bowtie_{\theta_{n-1}} R_n) \bowtie_{\psi_n} Q))$$

Finally, the CMT step can be repeatedly applied on the expression $$((\ldots (R_1 \bowtie_{\theta_1} R_2) \ldots \bowtie_{\theta_{n-1}} R_n) \bowtie_{\psi_n} Q)$$

as described below. First define $S_i$, $i \geq 1$, as follows:

$$S_1 \stackrel{def}{=} R_1$$

$$S_{i+1} \stackrel{def}{=} (S_i \bowtie_{\theta_i} R_{i+1}), i \geq 1$$

Also, let $\psi_i$, i<n denote the strongest subset of $\psi_{i+1}$ that uses only attributes of Q and $S_i$, and $\gamma_i$, i<n denote the rest of $\psi_{i+1}$.

The first application of the CMT step transforms $$(S_{n-1} \bowtie_{\theta_{n-1}} R_n) \bowtie_{\psi_n} Q$$

to $$(S'_{n-1} \bowtie_{\theta_{n-1}} R'_n) \bowtie_{\psi_n} Q$$

where $$S'_{n-1} = (S_{n-1} \bowtie_{\psi_{n-1}} Q) \text{ and } R'_n \bowtie_{\theta_{n-1} \wedge \psi_{n-1}} (Q \bowtie_{\psi_{n-1}} S'_{n-1}).$$

Now, consider $S''_{n-1}$; the $\theta$-semijoin can be pushed into the definition of $S'_{n-1}$ in exactly the same manner as above. Thus the CMT step is applied on each $S_i$, $n \leq i \leq 2$. Note that there are two occurrences of $S'_{n-1}$, i.e., it is a common subexpression of two expressions. By using labeled expressions, the cost of optimizing and evaluating the expression twice is avoided. Using labeled expressions is very important to avoid an exponential blow up as we go down from $S_n$ to $S_1$.

D. Heuristic CM Transformation of SQL Queries With Multiple Views

The θ-semijoin transformation of an SQL query block is performed. This block may contain uses of view relations, and after the transformation the use of a relation $R_i$ may have a semijoin of the form $R_i \ltimes_{\beta_i} Q_i$, or $R_i \ltimes_{\beta_i} (Q \ltimes_{\psi_{n-1}} S'_{n-1})$. Let $E_i$ denote the entire semijoin expression involving $R_i$. If $R_i$ is a view relation, a specialized version $R'_i$ of the view definition of $R_i$, with the semijoin pushed into it, can be created recursively using the θ-semijoin transformation of the SQL block defining $R_i$. Finally, if all of $\beta_i$ can be pushed into the view definition of $R_i$, then $E_i$ is replaced by R'; else only $R_i$ in $E_i$ is replaced by $R'_i$.

The relationship between the CMT step and Constraint Magic rewriting discussed earlier for a single join also carries over to the case of views, and to queries defined using multiple views.

Thus for SQL queries, the effect of Constraint Magic rewriting is obtained as a special case of the θ-semijoin transformations, in particular by using the CMT step. If the full space of equivalent expressions is explored, Constraint Magic rewriting will be examined as an option, and the cheapest expression in the search space will be chosen.

The foregoing merely illustrates the principles of the invention. For example, the features of the invention need not only be used for query optimization. Indeed, they may be utilized in any procedure requiring the determination of equivalent relational algebraic expressions.

It will thus be appreciated that those skilled in the art will be able to devise numerous and various alternative arrangements which, although not explicitly shown or described herein, embody the principles of the invention and are within its spirit and scope.

We claim:

1. A method comprising the steps of:

receiving a computer programming language database query;

generating at least one relational algebraic expression in response to said query by means of a equivalence rule involving the multiset version of the theta-semijoin operator, said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) ∪ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset θ-join, and $\ltimes_\theta$ denotes the multiset θ-semijoin, and θ (with or without subscript) denotes quantifier-free predicates;

selecting at least one of said relational algebraic expressions; and accessing said computer programming language database based on said selected expression.

2. The method of claim 1 wherein said generating comprises the step of repeatedly applying said rule to at least one relational algebraic expression generated in response to said query.

3. The method of claim 1 wherein said computer programming language is SQL.

4. An apparatus comprising means for receiving a first relational algebraic expression responsive to an SQL query for a database;

means for transforming said first expression into at least one generated relational algebraic expression, said transforming involving an equivalence rule, said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) ∪ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset θ-join, and $\ltimes_\theta$ denotes the multiset θ-semijoin, and θ (with or without subscript) denotes quantifier-free predicates;

means for selecting at least one of said generated relational algebraic expressions; and means for accessing said database based on said selected expression.

5. The apparatus of claim 4 wherein said transforming means comprises means for reiteratively applying said equivalence rule to said expression responsive to said query.

6. A program storage device embodying a computer program to perform method steps for optimizing an SQL query to access a computer database, said method comprising accepting the query;

generating at least one relational algebraic expression in response to said query by means of a equivalence rule involving the multiset version of the theta-semijoin operator, said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) ∪ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset θ-join and $\ltimes_\theta$ denotes the multiset θ-semijoin.

7. The device of claim 6 wherein said generating further comprises repeatedly applying said rule to at least one relational algebraic expression generated in response to said query.

8. A storage device embodying an equivalence rule involving the multiset version of the relational algebraic theta-semijoin operator, said rule being such that when input to software employing relational algebraic expressions at least one relational algebraic expression is generated, said expression responsive to a computer language database query to access said computer language database, and said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) $\cup$ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset $\theta$-join, and $\ltimes_\theta$ denotes the multiset $\theta$-semijoin, and $\theta$ (with or without subscript) denotes quantifier-free predicates.

9. A method comprising the steps of
receiving at least two computer programming language database queries;
for each query, generating at least one relational algebraic expression in response to said query by means of a equivalence rule involving the multiset version of the thetasemijoin operator, said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) $\cup$ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset $\theta$-join, and $\ltimes_\theta$ denotes the multiset $\theta$-semijoin, and $\theta$ (with or without subscript) denotes quantifier-free predicates; and determining equivalence of said queries based on said generated relational algebraic expressions.

10. A method comprising the steps of
receiving a computer programming language database query; and
generating at least one relational algebraic expression in response to said query by means of a equivalence rule involving the multiset version of the theta-semijoin operator such that Constraint Magic rewriting on said query is effectuated, said rule being $$(E_1 \bowtie_{\theta_1} E_2) \ltimes_{\theta_2 \wedge \theta_3} Q = (E_1' \bowtie_{\theta_1} E_2') \ltimes_{\theta_2 \wedge \theta_3} Q$$

where $\theta_2$ involves only the attributes in attrs(Q) $\cup$ attrs($E_1$), $$E_1' = E_1 \ltimes_{\theta_2} Q, \quad E_2' = E_2 \ltimes_{\theta_1 \wedge \theta_3} (E_1' \ltimes_{\theta_2} Q),$$

Q denotes a query, E (with or without subscripts) denotes relational expressions, attrs(X) denotes attributes of the result of X, $\bowtie_\theta$ denotes the multiset $\theta$-join, and $\ltimes_\theta$ denotes the multiset $\theta$-semijoin, and $\theta$ (with or without subscript) denotes quantifier-free predicates.

* * * * *